United States Patent
Faraone et al.

(10) Patent No.: US 10,051,413 B2
(45) Date of Patent: Aug. 14, 2018

(54) METHOD FOR EXCHANGING INFORMATION CORRESPONDING TO A PUBLIC SAFETY INCIDENT

(71) Applicant: MOTOROLA SOLUTIONS, INC, Chicago, IL (US)

(72) Inventors: Antonio Faraone, Fort Lauderdale, FL (US); Fabio M Costa, Weston, FL (US); Daniel A Tealdi, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/392,139

(22) Filed: Dec. 28, 2016

(65) Prior Publication Data

US 2018/0184236 A1 Jun. 28, 2018

(51) Int. Cl.
| | | |
|---|---|---|
| H04B 7/00 | (2006.01) | |
| H04M 11/04 | (2006.01) | |
| H04W 24/00 | (2009.01) | |
| H04W 4/02 | (2018.01) | |
| H04W 4/22 | (2009.01) | |
| H04W 8/22 | (2009.01) | |
| H04W 8/18 | (2009.01) | |
| H04W 76/00 | (2018.01) | |

(Continued)

(52) U.S. Cl.
CPC ............ *H04W 4/02* (2013.01); *G09B 29/007* (2013.01); *G09B 29/106* (2013.01); *H04B 17/318* (2015.01); *H04W 4/026* (2013.01); *H04W 4/027* (2013.01); *H04W 4/08* (2013.01); *H04W 4/22* (2013.01); *H04W 4/90* (2018.02); *H04W 8/18* (2013.01); *H04W 8/186* (2013.01);

(Continued)

(58) Field of Classification Search
CPC ...... H04W 84/08; H04W 36/30; H04L 63/10; G01S 19/235
USPC ........................ 455/404.2, 456.1, 515, 404.1
See application file for complete search history.

(56) References Cited

U.S. PATENT DOCUMENTS

| | | | |
|---|---|---|---|
| 6,842,774 B1 * | 1/2005 | Piccioni ................. | G08B 25/08 340/6.1 |
| 6,885,874 B2 * | 4/2005 | Grube ................... | H04W 84/08 455/520 |

(Continued)

OTHER PUBLICATIONS

Surveillance Self-Defense, The Problem with Mobile Phones, A Project of the Electronic Frontier Foundation, https://ssd.eff.org/en/module/problem-mobile-phones, last updated: Feb. 10, 2015, all pages.

(Continued)

*Primary Examiner* — William D Cumming

(57) ABSTRACT

A method to operate a controller for exchanging information corresponding to a public safety incident is provided. In operation, the controller transmits a request to communication networks to send location information for portable communication devices operating in a region of interest. The controller, based on the location information received from the communication networks for the portable communication devices, selects a subset of portable communication devices. The controller assigns each device in the subset to a trusted group of devices or a non-trusted group of devices based on the respective subscriber profile and operating characteristics of the portable communication devices. The controller then establishes a connection with high priority portable communication devices in the trusted group via a public safety communication network to exchange information corresponding to the incident.

19 Claims, 6 Drawing Sheets

(51) Int. Cl.

| | |
|---|---|
| *H04W 36/14* | (2009.01) |
| *H04B 17/318* | (2015.01) |
| *H04W 64/00* | (2009.01) |
| *H04W 4/08* | (2009.01) |
| *G09B 29/00* | (2006.01) |
| *G09B 29/10* | (2006.01) |
| *H04W 4/90* | (2018.01) |
| *H04W 76/50* | (2018.01) |
| *H04W 88/06* | (2009.01) |

(52) U.S. Cl.
CPC ............. *H04W 8/22* (2013.01); *H04W 36/14* (2013.01); *H04W 64/00* (2013.01); *H04W 76/007* (2013.01); *H04W 76/50* (2018.02); *H04W 88/06* (2013.01)

(56) References Cited

U.S. PATENT DOCUMENTS

| | | | |
|---|---|---|---|
| 8,768,315 B2 | 7/2014 | Miller et al. | |
| 8,880,096 B2 * | 11/2014 | Rousu | G01S 19/235 |
| | | | 455/456.1 |
| 8,892,132 B2 | 11/2014 | Monks et al. | |
| 9,107,135 B1 * | 8/2015 | Kennedy | H04W 4/90 |
| 9,386,421 B2 | 7/2016 | Bolon et al. | |
| 9,508,200 B1 * | 11/2016 | Mullen | G07C 5/008 |
| 2003/0100326 A1 * | 5/2003 | Grube | H04W 84/08 |
| | | | 455/515 |
| 2010/0291894 A1 | 11/2010 | Pipes | |
| 2013/0162470 A1 * | 6/2013 | Rousu | G01S 19/25 |
| | | | 342/357.31 |
| 2014/0141799 A1 * | 5/2014 | Rousu | G01S 19/235 |
| | | | 455/456.1 |
| 2014/0187190 A1 * | 7/2014 | Schuler | H04W 4/90 |
| | | | 455/404.1 |
| 2015/0147997 A1 | 5/2015 | Shaw et al. | |
| 2015/0244903 A1 * | 8/2015 | Adams | G02B 27/017 |
| | | | 348/376 |
| 2016/0205524 A1 | 7/2016 | Wawrowski et al. | |

OTHER PUBLICATIONS

The International Search Report and The Written Opionion, corresponding serial No. PCT/US2017/066250 filed Dec. 14, 2017, all pages.

* cited by examiner

METHOD FOR EXCHANGING INFORMATION CORRESPONDING TO A PUBLIC SAFETY INCIDENT

BACKGROUND OF THE INVENTION

Public safety forces rely on information obtained from dispatch centers to respond to an incident. However, information obtained from such remote sources may not always reflect the ground situation and further may not be effective in responding to an ongoing public safety incident. Additional, incident-specific information can be obtained from witnesses and injured persons. However, this is possible only if the witnesses and/or injured persons are timely identified and provided that they are in a capacity and willing to share any information about the incident. Further, in most cases, it is possible to obtain information from witnesses and injured persons only after the incident is over and the situation has been brought back to normal.

Accordingly, there is a need for a method that will enable public safety forces to respond more effectively to an ongoing situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
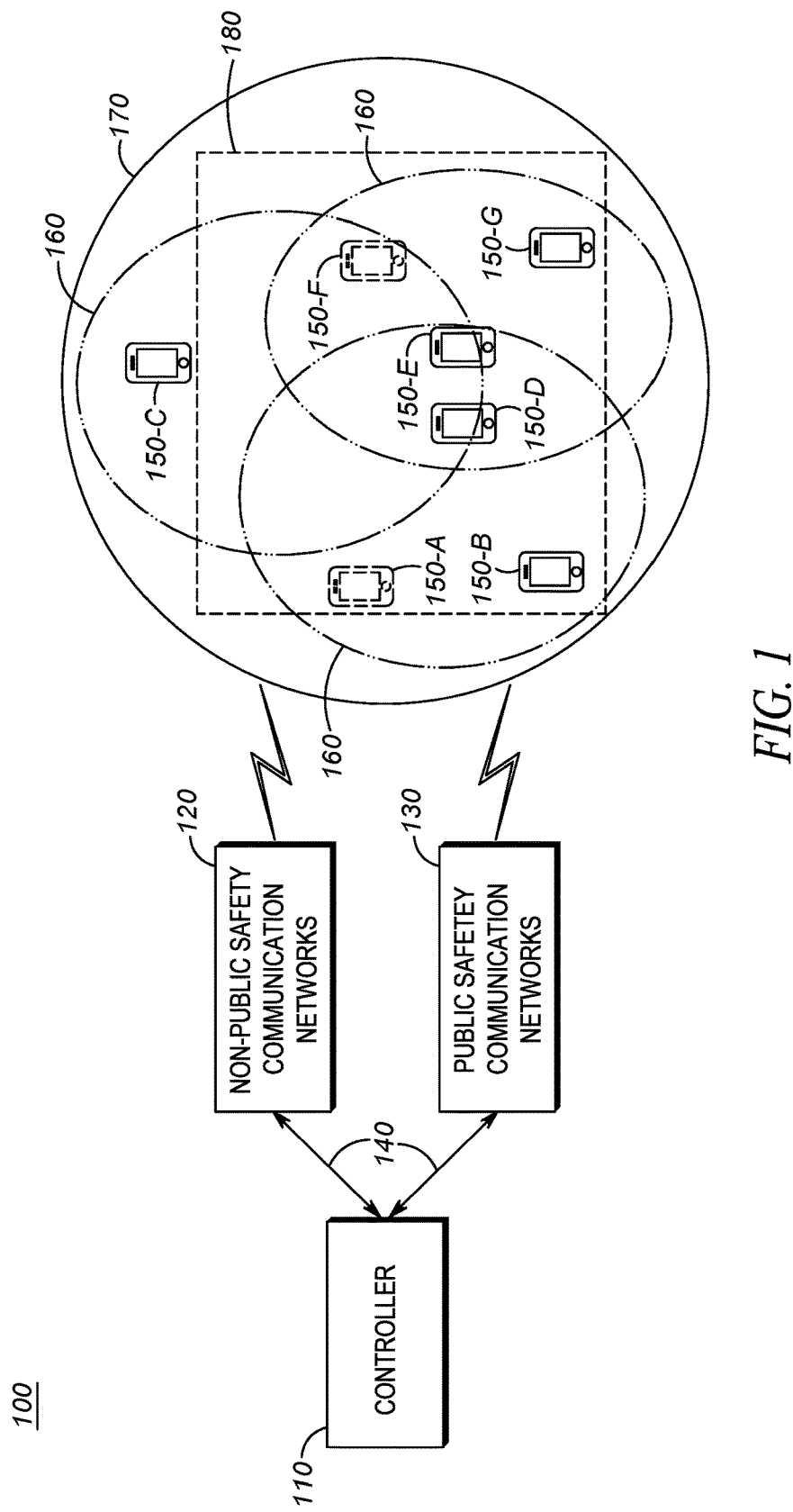
FIG. 1 is a block diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of operating a controller to exchange information corresponding to a public safety incident. The method includes transmitting a request to one or more communication networks to send location information for portable communication devices operating in a region of interest, selecting a subset of portable communication devices based on location information received from the one or more communication networks for the portable communication devices, receiving a subscriber profile and operating characteristics corresponding to each of the portable communication devices in the subset from the one or more communication networks, assigning each of the portable communication devices to one of a trusted group of devices and a non-trusted group of devices based on the respective subscriber profile and operating characteristics of the portable communication devices, and establishing a connection with the portable communication devices in the trusted group to exchange information corresponding to the public safety incident.

Another exemplary embodiment provides a controller for exchanging information corresponding to a public safety incident. The controller includes a network interface; and an electronic processor coupled to the network interface. The electronic processor of the controller is configured to transmit, via the network interface, a request to one or more communication networks to send location information for portable communication devices operating in a region of interest, select a subset of portable communication devices based on location information received from the one or more communication networks for the portable communication devices, receive, via the network interface, a subscriber profile and operating characteristics corresponding to each of the portable communication devices in the subset from the one or more communication networks, assign each of the portable communication devices to one of a trusted group of devices and a non-trusted group of devices based on the respective subscriber profile and operating characteristics of the portable communication devices, and establish, via the network interface, a connection with the portable communication devices in the trusted group to exchange information corresponding to the incident.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a block diagram of one exemplary embodiment of a communication system 100. The communication system 100 includes a controller 110, one or more non-public safety communication networks 120, and one or more public safety communication networks 130. In accordance with some embodiments of the present disclosure, the controller 110 is implemented as a communication server capable of communicating with non-public safety communication networks 120 and public safety communication networks 130 via wired or wireless connections 140 or a combination of both. The controller 110 communicates and coordinates with the networks 120, 130 in response to a public safety incident occurring in one or more geographic areas. The communication system 100 further includes a plurality of portable communication devices 150 operating in one or more wireless communication coverage areas 160 provided by the non-public safety communication networks 120. In the example illustrated in FIG. 1, the portable communication devices 150 include a first portable communication device 150-A, a second portable communication device 150-B, a third portable communication device 150-C, a fourth portable communication device 150-D, a fifth portable communication device 150-E, a sixth portable communication device 150-F, and a seventh communication device 150-G are shown. For ease of understanding, the interior portion of first portable communication device 150-A and sixth portable communication device 150-F is outlined in dashed lines to indicate that these communication devices are identified as being associated with a first group of devices, which is different (for example, in terms of device activity or user behavioral pattern inferred for instance through location patterns, usage pattern, etc.) than other devices operating in the proximity within the geographic area of interest. In the following description, when explaining how a single portable communication device functions, a reference to portable communication device 150 is used. It is not necessary, however, that the portable communication devices 150-A through 150-G be identical. The portable communication devices 150-A through 150-G are merely exemplary. In some embodiments, the communication system 100 may include more or fewer portable communication devices than illustrated in FIG. 1, depending on the number of devices operating in the area.

In accordance with some embodiments, the non-public safety communication networks 120 include communication networks and associated infrastructure systems that are operated by one or more commercial service providers to provide wireless communication services to portable communication devices 150 operating in one or more coverage areas 160 with service subscription. In one embodiment, the service providers include cellular carriers that operate the respective non-public safety communication networks 120. The non-public safety communication networks 120, for example, are implemented in accordance with one or more communication standards such as long term evolution (LTE), global system for mobile communications (GSM), and universal mobile telecommunication system (UMTS). Service providers using other communication standards may also be employed as long as the service providers comply with the service request of the controller 110 that would allow the controller 110 to identify and exchange information with select portable communication devices 150 operating in a given geographic area during a public safety incident.

The public safety communication networks 130 refers to communication networks that are controlled and operated by public safety agencies to facilitate secure communication between radio devices of public safety officers and with the controller 110. The public safety communication networks 130 include, but are not limited to, land mobile radio (LMR) networks, association of public safety communication officials (APCO) Project 25 (P25) networks, and public safety long term evolution (LTE) networks. In one embodiment, the public safety communication networks 130 includes at least one network that is implemented in accordance with the LTE 'Band 14' 3rd Generation Partnership Project (3GPP) standard that allows controller 110 and at least some of the portable communication devices 150 to bypass non-public communication networks 120 and establish direct communication with each other using the radio environment provided by the LTE 'Band 14' standard.

The portable communication devices 150 (also referred herein as devices or communication devices or user equipments or radio devices) include communication devices that are typically carried by non-professional users for their day-to-day communications. The portable communication device 150 may be a handheld communication device, for example, a mobile telephone, mobile radio, tablet, smart watch or other smart wearable device, or other devices that are or can be configured to communicate over the networks 120, and possibly in a subset of devices over the networks 130. In some embodiments, the portable communication device 150 may also include a handheld radio or other communication devices associated with public safety agencies.

The controller 110 is activated or deployed in response to a public safety incident to perform the methods described herein. In accordance with some embodiments, the controller 110, in response to a public safety incident, identifies a region of interest 170 relative to one or more geographic areas (referred to as incident area 180) impacted by the public safety incident and requests one or more service providers to identify and provide information about the portable communication devices 150 operating in their coverage areas corresponding to the region of interest 170. Because of the specific interest in devices 150 within the region of interest 170, the coverage areas 160 are further specified as those coverage portions of each of the networks 120 and 130 that are enclosed in the region of interest 170. For instance, if one network 120 is a cellular network comprising antenna towers distributed in the territory, each tower featuring several antennas that cover different angular sectors in the area around the tower, then the respective coverage area 160 is determined by the towers and sectors that provide service within the region of interest 170.

Further, the controller 110, based on information received from the service providers via the non-public safety communication network 120, identifies devices of interest (DOI) based on the information obtained about the portable communication devices 150 operating in the region of interest 170 and assigns/tags the DOI to a trusted group of devices or a non-trusted group of devices. The controller 110 further provisions select devices from the trusted group of devices to securely communicate with the controller 110 via one of the non-public safety communication networks 120 or one of the public safety communication networks 130. In accordance with some embodiments, the assignment of identified devices to a trusted group and a non-trusted group by the controller 110 helps public safety officers differentiate the device owners (e.g. based on their identity and behavioral parameters such as threat level, trustworthiness, and the like) associated with the DOI and prepare their response plan to the public safety incident. For example, in a public safety incident such as a hostage situation, the public safety officers can use this information to differentiate the devices as either being associated with hostages or hostage-takers (also called as kidnappers). For example, as shown in FIG. 1, the controller 110 identifies portable communication devices 150-B, 150-D, 150-E, and 150-G as being associated with a hostage and portable communication devices 150-A and 150-F as being associated with a hostage-taker. Further, in FIG. 1, the interior portion of portable communication devices 150-A and 150-F associated with the hostage taker are outlined in dashed lines. FIG. 1 also further shows portable communication device 150-C that is located outside of the incident area 180 and therefore likely not directly impacted by the hostage situation. Nevertheless, in accordance with embodiments of the present disclosure, the controller 110 also monitors devices located outside of the incident area 180 within the region of interest 170.

Figure 2:
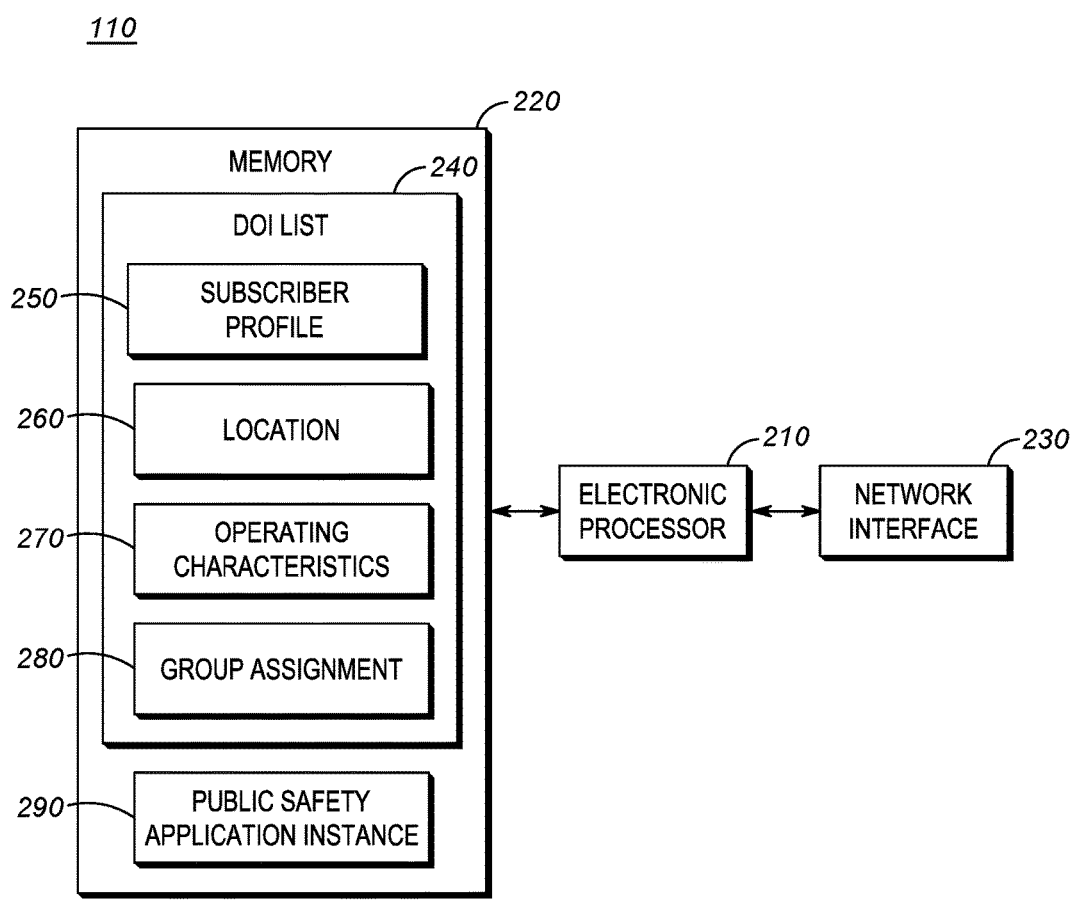
FIG. 2 is a block diagram of a controller employed in the communication system of FIG. 1, in accordance with some embodiments.

FIG. 2 is a block diagram of a controller 110 in accordance with some embodiments. In one embodiment, the controller 110 is implemented in a server computer such as a computer aided dispatch (CAD) console or a command center that are deployed by public safety agencies to monitor a public safety incident and provide instructions to public safety officers responding to the incident. In another embodiment, the controller 110 is implemented in a radio device carried by the public safety officers responding to an incident. In alternate embodiments, the functionality and components associated with the controller 110 is implemented in a distributed manner in different server and/or portable devices employed for the purposes of public safety.

The controller 110 includes an electronic processor 210, for example, a microprocessor or another electronic device. The electronic processor 210 may include input and output interfaces (not shown) and be electrically connected to a memory 220 and a network interface 230. In some embodiments, the controller 110 may include fewer or additional components in configurations different from that illustrated in FIG. 2. For example, in some embodiments, the controller 110 also includes a display, speaker, and microphone. In some embodiments, the controller 110 performs additional functionality than the functionality described below.

The memory 220 includes read-only memory (ROM), random-access memory (RAM), other non-transitory computer-readable media, or a combination thereof. The electronic processor 210 is configured to receive instructions and data from the memory 220 and execute, among other things, the instructions. In particular, the electronic processor 210 executes instructions stored in the memory 220 to perform the methods described herein.

The network interface 230 sends and receives data to and from the networks 120, 130. The network interface 230 may include a transceiver for wirelessly communicating with the non-public safety communication networks 120 and public-safety communication networks 130. Alternatively or in addition, the network interface 230 may include a connector or port for receiving a wired connection, such as an Ethernet cable. The electronic processor 210 may generate electrical signals and may communicate information relating to the electrical signals over the networks 120, 130 through the network interface 230, such as for receipt by portable communication devices 150 operating in the region of interest 170 or by radio devices (not shown) associated with public safety officers. Similarly, the electronic processor 210 may output data received from the networks 120, 130 through the network interface 230, through a speaker or a display, or a combination thereof.

In accordance with some embodiments, the memory 220, in addition to storing the instructions needed for the electronic processor 210 to perform the methods described herein, maintains and updates a database that includes device of interest (DOI) list 240 corresponding to the portable communication devices 150 identified as operating in the region of interest 170. The DOI list 240 includes subscriber profile information 250 corresponding to users of the portable communication devices 150, location information (current and historical location data) 260 of the portable communication devices 150, operating characteristics 270 of the portable communication devices 150, and group assignment information 280. In one embodiment, the subscriber profile information 250, location information 260, and operating characteristics 270 of the portable communication devices 150 in the DOI list 240 are obtained by the controller 110 through the non-public safety communication networks 120. The subscriber profile information 250 includes identity and historical information (e.g. call history, contact list, social network information, billing information etc.) associated with the user of the device. The operating characteristics 270 include, but not limited to, device identity, a frequency of movement of the device, orientation of the device, operating features of the device including hardware and software capability, device configuration parameters, signal strength, inertial activity trends, and a battery condition of the device. The group assignment information 280 identifies each portable communication device 150 included in the DOI list 240 as being associated with either a trusted group of devices (for example, hostage devices during hostage situation) or a non-trusted group of devices (for example, hostage-taker devices during hostage situation). In accordance with some embodiments, the assignment of each portable communication device 150 in the DOI list 240 to either the trusted group or non-trusted group is based at least in part on the subscriber profile information 250, location information 260, and operating characteristics 270 of the portable communication device 150. In some embodiments, the trusted group can be further divided into sub-groups (e.g. fire fighters group, medical responders group, police officers group, hostage devices group etc.) based on predefined parameters depending on the context and type of public safety incident. The non-trusted group can be similarly divided into sub-groups based on the context and type of public safety incident.

In accordance with the embodiments, the electronic processor 210 selects portable communication devices 150 (for example, one or more devices from the trusted group) from the DOI list 240 and establishes a connection to securely communicate with the selected devices via one of the non-public safety communication networks 120 or one of the public safety communication networks 130. In one embodiment, the portable communication device 150 is handed over to one of the public-safety communication networks 130 that is compatible with the communication capability of the device 150. Communication with each selected device is established through one of the available networks 120, 130, and handover between networks may be effected if so desired, for instance to increase the RF (radio-frequency) communication link-margin in order to communicate more reliably by establishing cellular microcells within the region of interest 170 using deployable radio base station equipment (for example, on drones, vehicles, and the like). During this communication, the controller 110 may be able to send or receive incident specific information (for example, intelligence about the hostage-takers including their positions, weapons carried by them, information about interiors of a building structure, speech and image data of individuals present in the incident scene, etc.) either by directly communicating with select users carrying the devices 105 or by remotely controlling their devices 150 to perform one or more operations to exchange incident specific information (for instance, audio streams, pictures, etc.). The incident specific information is uploaded from the select devices to the controller 110 and stored in the memory 220, either periodically or in response to specific triggers such as when the incident situation returns to normal state, or when the device is removed from the trusted group because of a predefined condition (e.g. low battery condition) or change in the operating characteristics of the device (e.g. operating characteristics pattern may indicate that the device has changed possession from the hostage to the hostage-taker). In accordance with some embodiments, the controller 110 securely distributes the obtained incident specific information to other devices or servers associated with the public safety officers for further distribution and processing.

The memory 220 may further maintain one or more public safety application instances 290 to enable the controller 110 to establish a communication with selected portable communication devices via the public safety communication network 130. For example, the public safety application instance 290 maintained by the controller 110 may include instructions and settings that are surreptitiously pushed to selected portable communication devices in the DOI list 240 for provisioning and/or installation in the selected portable communication devices and for remotely controlling one or more operations of the selected portable communication devices. For example, the public safety application instance 290 which when provisioned in a portable communication device 150 would allow the controller 110 to initiate a handover procedure and switch the connection of the portable communication device 150 from one of the non-public safety communication networks 120 to one of the public safety communication networks 130, for instance to increase communications reliability since public safety communication networks 130 may be able to allocate more communications resources to specific devices if so desired. Further, the public safety application instance 290 allows the portable communication device 150 to securely exchange information with the controller 110 or other public safety devices and servers identified by the controller 110 via any of the public safety communication networks 130.

In accordance with some embodiments, the public safety application instance 290 once installed or provisioned in the portable communication device 150 also enables the controller 110 to operate the portable communication device 150 in covert mode. For example, the controller 110 remotely controls or activates a microphone of the portable communication device 150 to perform ambient listening and send information periodically, continuously, or as requested by the controller 110. The controller 110 may also control a sound profile of the portable communication device 150, for example, to either operate in a silent mode or vibration only mode. In another example, the controller 110 may remotely control the display of the portable communication device 150 to operate at a reduced brightness level and/or in a locked state. This may ensure that the portable communication device 150 (and also the user associated with the portable communication device 150) remains undetected during an incident situation such as the hostage situation. The controller 110 may also activate, deactivate, and/or monitor one or more combinations of other hardware (e.g. accelerometers, global positioning system (GPS), other sensors etc.) and software features to gather information about the incident situation. In some embodiments, the controller 110 may monitor a state of charge of a battery (e.g. battery condition or current charge level) of the portable communication device 150. This would allow the controller 110 to determine if the portable communication device 150 has enough power to operate and exchange information during the incident situation. In one embodiment, the controller 110 selects the DOI operating in the region of interest 170 also based on the state of charge of the battery of the portable communication device 150, since for instance the expectation of a longer battery life confers a higher reliability score to a device compared to another device with a shorter expected battery life. In accordance with embodiments of the disclosure, when the portable communication device 150 operates in covert mode, features/functions of the portable communication device 150 (including emergency features such as sending and receiving calls and messages) other than the features/functions remotely controlled by the portable communication device 150 continue to be operated in regular mode and available to users.

Figure 3:
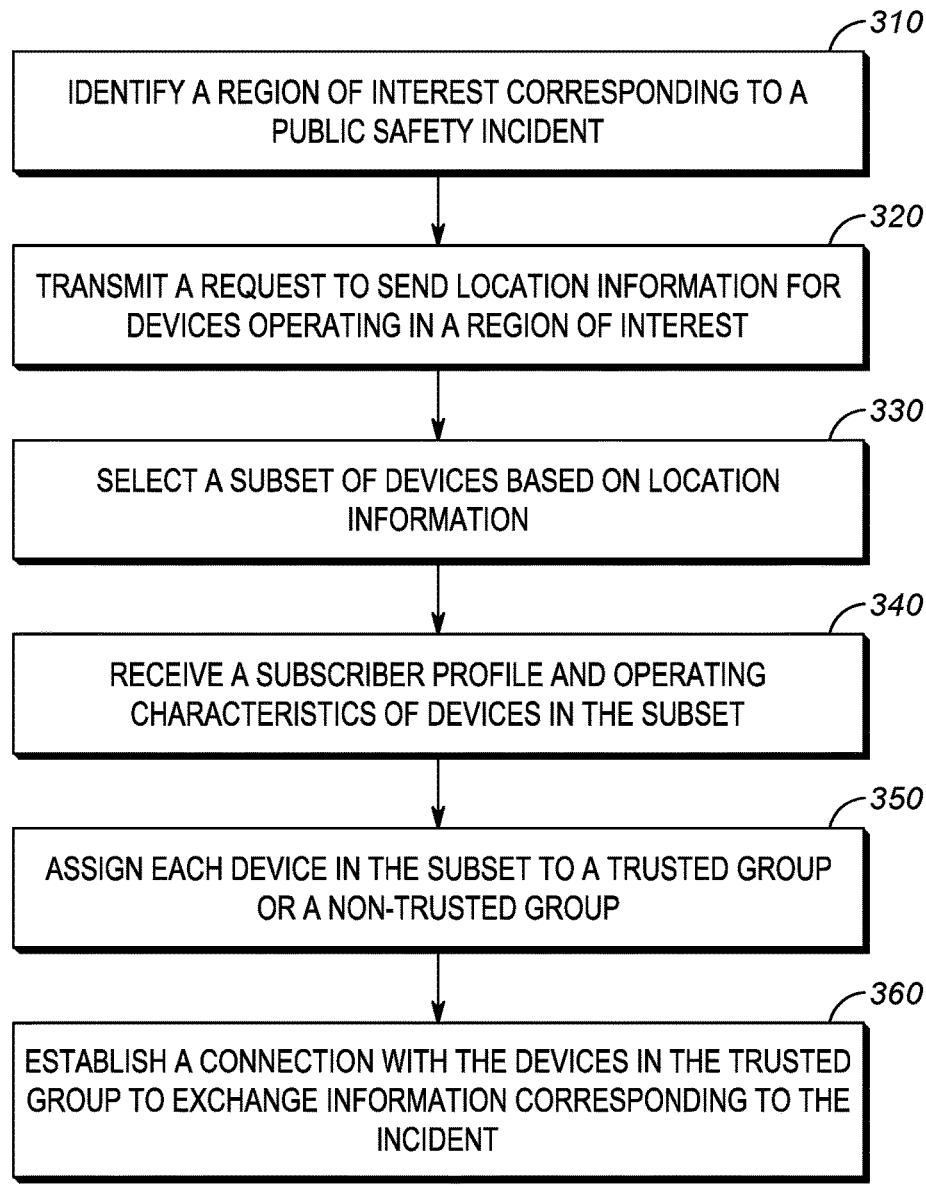
FIG. 3 is a flowchart of a method for operating a controller of FIG. 1 to exchange information corresponding to a public safety incident, in accordance with some embodiments.

FIG. 3 is a flowchart of an exemplary method 300 of operating a controller 110 to exchange information corresponding to a public safety incident. As an example, the method 300 is performed by the electronic processor 210 of the controller 110. Other embodiments of the method 300 may be performed on multiple processors within the same device or on multiple devices.

At block 310, the controller 110 identifies a region of interest (e.g. region of interest 170 shown in FIG. 1) corresponding to a geographic area or physical feature i.e. incident area 180 that is impacted by the public safety incident. In one embodiment, the controller 110 may receive a user input (or a trigger) that instructs the controller 110 to perform the method 300 for exchanging information corresponding to the public safety incident. The controller 110 may receive initial information about the public safety incident such as incident location (e.g. address, location coordinates, features of the location etc), incident type, incident severity level, and the like, via user input and/or remote sources. Based on instruction and information received about the public safety incident, the controller 110 identifies the region of interest 170 for identifying devices (e.g. portable communication devices 150) operating in the region of interest 170. In one embodiment, the identified region of interest 170 may have a perimeter larger than the perimeter of the incident area 180. As used herein, the term 'incident area' (also referred herein as a 'geo-fence' of the incident) refers to an area (within the region of interest 170) that is most impacted by the incident, for example, particular floors in a building structure where the hostage situation is taking place. This will allow the controller 110 to identify and monitor the devices located within the perimeter of the incident area 180 as well as the devices operating in the vicinity, but outside of the incident area 180.

Next, at block 320, the controller 110 transmits a request to one or more communication networks 120, 130 to send location information for communication devices operating in the region of interest 170. In one embodiment, the controller 110 selects one or more service providers (e.g. cellular carriers) operating their networks (e.g. non-public safety communication networks 120) in one or more coverage areas (e.g. coverage areas 160) within the identified region of interest 170. The controller 110 then sends a request to selected service providers to send location information for devices operating in the region of interest 170. In response, the service providers via their respective non-public safety communication networks 120 monitor the devices currently operating in the respective coverage areas corresponding to the region of interest 170 and sends location information of the monitored devices. In one embodiment, the non-safety public safety communication networks 120 send identity (e.g., international mobile station equipment identity (IMEI)) of the monitored devices along with its current location information and available historical location information. In one embodiment, the controller 110, in addition to transmitting a request to send location information also sends a request to the non-public safety communication networks 120 to continuously track location of the devices (including devices that may enter or leave the region of interest 170 during the incident) and send location tracking information to the controller 110. In one embodiment, the controller 110 requests the non-public safety communication networks 120 to activate location tracking for devices operating in its coverage area irrespective of the current state of location tracking configuration in the devices. It is possible that some devices may have disabled the location tracking, e.g., for privacy reasons or to save battery charge, and some devices may have enabled the location tracking. In emergency situations, the controller 110 will request the service providers to 'override' the current location tracking settings in devices and activate location tracking for all devices 150 operating in the region of interest 170. In this implementation, when the incident is over, the controller 110 may request the non-public safety communication networks 120 to return the devices 150 to their previous location tracking configuration state depending on whether the location tracking configuration state of the devices was 'enabled' or 'disabled' prior to the incident. Embodiments of the present disclosure allow the users of a device 150 to pre-configure their device to opt-out of the 'overriding' function performed at the device 150 in response to the controller's request. In addition, the user of the device 150 is also allowed to disable the 'overriding' function or location tracking at any time during or after the incident.

Next, at block 330, the controller 110 selects a subset of devices operating in the region of interest 170 and monitored by the non-public safety communication networks 120 based at least in part on the location information received from the non-public safety communication networks 120. In accordance with embodiments, the subset of devices is referred to as devices of interest (DOI) and included in a DOI list 240 maintained by the memory 220 of the controller 110. In one embodiment, the controller 110 selects a device based on a predefined criteria that is satisfied, for example: a) if the communication device is operating in the incident area 180, for example, a particular area (within the region of interest 170) where the user of the device is directly related or impacted by the incident and/or likely to be caused harm or injury; and b) if the communication device is operating in a non-incident area (an area outside the perimeter of the incident area 180, but within the region of interest 170), but either moving in the direction of the incident area 180 or operating in proximity to the perimeter of the incident area 180. In other embodiments, the controller 110 may use other predefined criteria involving location information and incident specific or user specific information received from the non-public safety communication networks 120 to determine if a particular device is a DOI. In one embodiment, the controller 110 may send a request to non-public safety communication networks 120 to return the devices that are not selected as DOI (i.e. not included in the DOI list 240) to their original state, for example, previous location tracking configuration state.

Next, at block 340, the controller 110 receives subscriber profile information (for example, subscriber profile information 250) and operating characteristics (for example, operating characteristics 270 corresponding to devices in DOI list 240). The subscriber profile information 250 may be received from the non-public safety communication networks 120 via request to service providers and/or from other trusted data sources. In one example, the controller 110 may obtain subscriber profile information 250 through a request to public safety agency network to conduct a background check on the particular subscriber based on one or more sources such as public and private records, criminal and arrest records, purchase history, activity in social networks, call and message history, and the like. The operating characteristics 270 of the devices in the DOI list 240 are obtained from the non-public safety communication networks 120. In one embodiment, the controller 110 may also receive other information related to the public safety incident from other sources such as traffic, weather, building blueprints, traffic light camera feeds, security camera feeds in or around buildings, alarm system status, etc.

Next, at block 350, the controller 110 assigns each communication device in the subset (i.e. DOI list) to either a trusted group or a non-trusted group. The controller 110 also stores this assignment (e.g. group assignment information 280) in the memory 220. In accordance with the embodiments, the controller 110 performs the assignment based at least in part on the subscriber profile information 250 and operating characteristics 270 of the device. In one implementation, the controller 110, monitors the operating characteristics 270 of the device as received from the non-public safety communication network 120, verifies the subscriber profile corresponding to the device based on information received from one or more trusted data sources, assigns the device to the trusted group when the operating characteristics meet a predefined condition (e.g., no movement) and when the corresponding subscriber profile is verified (e.g., no criminal background), and assigns the device to the non-trusted group when the operating characteristics 270 do not meet the predefined condition (e.g. frequent movement) or when the corresponding subscriber profile is troubling or not verifiable (e.g. criminal background or no previous record). For example, in a hostage situation, the controller 110 may track movement history of DOIs and tag verifiable devices (based on subscriber profile) that show minimal or no change in position as a hostage device and also further tag non-verifiable devices (based on subscriber profile) that move frequently as hostage-taker devices. Based on the tagging, the controller 110 assigns the devices as either being associated with a hostage device or a hostage-taker device. In addition, the controller 110 may verify if the device owners are in fact the individuals who have been taken hostage and whether they are with others with no devices, for example, people related to the device owners. The controller 110 can also use the same predefined condition to identify and tag other devices (in DOIs list) of individuals at risk of becoming hostages due to their proximity (e.g. on a different floor or adjacent offices) to the hostage scene or hostage-takers.

Next, at block 360, the controller 110 establishes a connection with the devices in the trusted group to send and receive information corresponding to the incident. In accordance with some embodiments, the controller 110 provisions one or more public safety application instances (e.g. public safety application instance 290) in each of the devices in the trusted group via the non-public safety communication networks 120, or, if any or all devices 150 have been handed over to public safety communication networks 130, through the public safety communication networks. After the handover, the controller 110 communicates with the devices in the trusted group directly via the public safety communication networks 130 and further remotely controls the devices, for example, to operate in covert mode. In accordance with embodiments, the group assignment information 280 is periodically updated to add or remove devices in the group based on the subscriber profile information 250, location information 260, and operating characteristics 270 of the devices. For example, a device in the non-trusted group can be removed from the non-trusted group and added to the trusted group if the monitored operating characteristics or subscriber profile information is updated to indicate that the user associated with the device does not pose danger to other individuals. Similarly, a device in the trusted group can be moved to the non-trusted group if one or more operating characteristics or other information reflect that the information gathered from the device cannot be trusted or the user of the device is likely to cause harm to other individuals in the incident scene.

In one embodiment, the controller 110 selects only some devices in the trusted group based on their operating characteristics and establishes a connection with only the selected devices. In this embodiment, the controller 110 may tag the selected devices as 'high priority' devices. For example, inertial activity trend of a device may be used to determine if that device belongs to a deceased individual or is contained within a purse or located in a desk, which would indicate that the device is not a good candidate for gathering or delivering information about the incident situation. In another example, the controller 110 may monitor the battery condition of the devices in the trusted group and may remove or add a device in the trusted group based on the battery condition to avoid battery depletion in the devices. In this embodiment, the controller 110 establishes communication only with high-priority devices under the assumption that the high-priority device users may find ways to relay information (received from the controller 110 and/or gathered directly from the incident scene) with other individuals (e.g. individuals not in possession of a high-priority device or with no device at all) located within the incident area 180. In one embodiment, the controller 110 sends instructions or notifications to the devices in the DOI. For example, the controller 110 sends instructions (e.g. evacuation route instructions) to one or more devices operating in the non-incident area to ensure that the devices operating in the non-incident area does not enter the incident area 180 within the region of interest 170. In another example, the controller 110 sends a warning notification or message if the DOIs operating in the non-incident area are moving in the direction of the incident area 180 or has moved to the non-incident area or is operating within a predetermined distance from DOIs operating in the incident area 180. This ensures that the users associated with the DOIs operating outside of the incident area 180 are alerted and informed about the risk in moving to the incident area 180.

Figure 4:
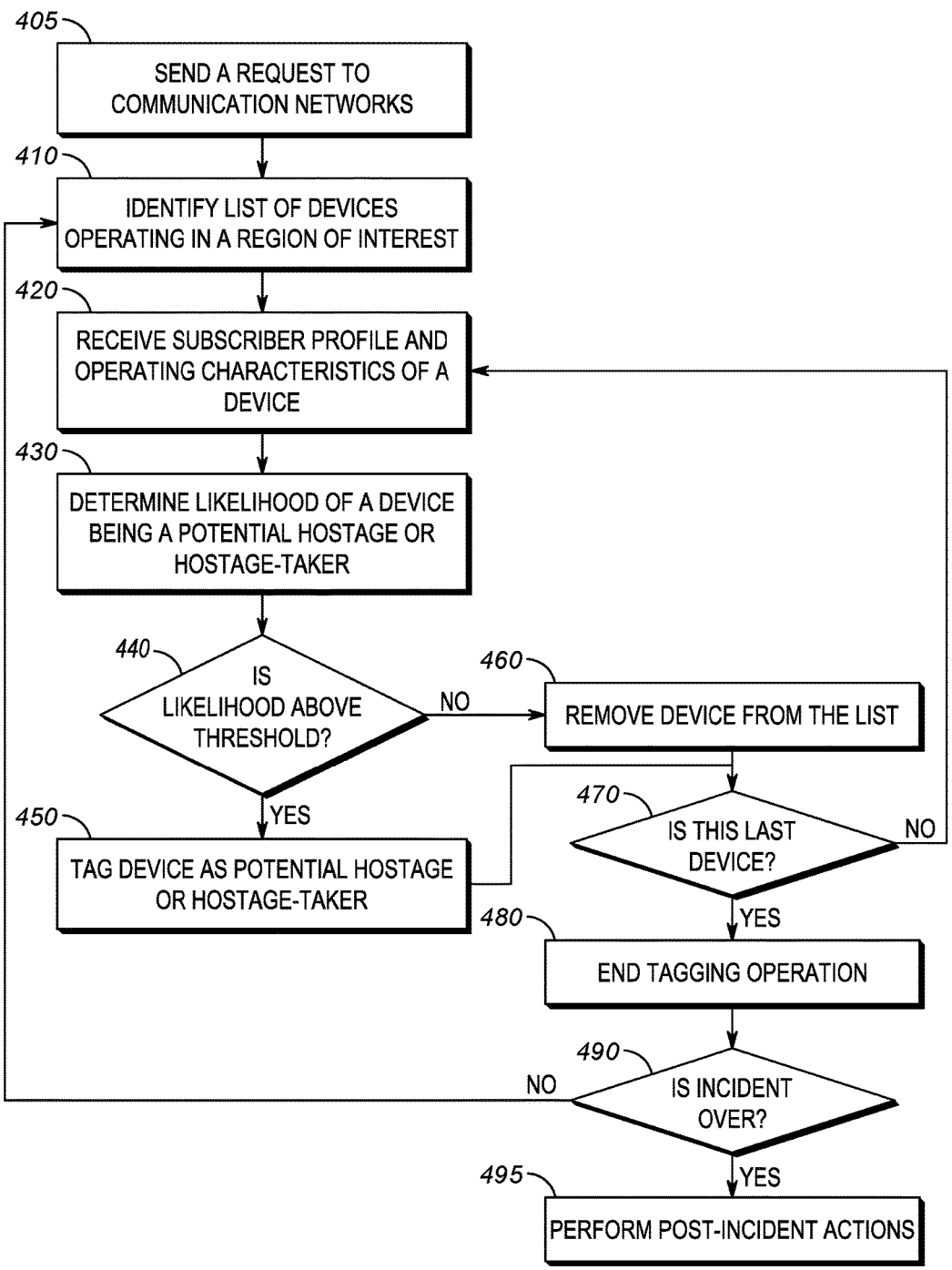
FIG. 4 is a flowchart of a method for operating a controller to tag portable communication devices included in devices of interest list corresponding to a hostage situation, in accordance with some embodiments.

FIG. 4 is a flowchart of an exemplary method 400 for operating a controller 110 to tag devices (i.e. portable communication devices 150) included in a DOI list corresponding to a hostage situation, in accordance with some embodiments. As an example, the method 400 is performed by the electronic processor 210 of the controller 110. Other embodiments of the method 400 may be performed on multiple processors within the same device or on multiple devices.

At block 405, the controller 110 sends a request to communication networks (for example, to non-public safety communication networks 120 via service providers) to identify and monitor devices operating in a region of interest (e.g. region of interest 170) corresponding to the hostage situation. In one embodiment, the request from the controller 110 also includes a request to activate location tracking for all devices operating in the region of interest 170. At block 410, the controller 110 identifies a list of devices (e.g., DOI list 240) operating in the region of interest 170 corresponding to the hostage situation. The DOI list 240 is identified based on the information obtained from the non-public safety communication networks 120 in response to the request sent from the controller 110 to service providers such as cellular carriers to identify and monitor devices operating in the region of interest 170. The controller 110 further periodically updates the DOI list 240 based on information received from the cellular carriers through the non-public safety communication network 120. In hostage situations, the devices in the DOI list 240 may include devices carried by or associated with hostages or potential hostages (also referred to as hostage devices) as well as devices carried by or associated with the hostage-takers (also referred to as hostage-taker devices).

At block 420, the controller 110 receives subscriber profile information 250 and operating characteristics 270 of a device in the DOI list 240 from non-public safety communication networks 120. Furthermore, the controller 110 obtains location information 260, device activity, device movement, user identity, and sensor data from cellular carriers through non-public safety communication networks 120 and/or other trusted data sources. Next, at block 430, the controller 110 processes this information to determine a likelihood of whether the device is associated with a hostage or a hostage taker. For example, the controller 110 may perform this determination via an analytics tool that processes one or more of the following parameters associated with the obtained information: proximity of the device to the region of interest, level of activity, proximity to other devices with similar device operating characteristics or corresponding user behavioral patterns. In one embodiment, the analytics tool provides a 'likelihood score' to indicate whether the device is a hostage device or hostage-taker device.

Next, at block 440, the controller 110 compares the likelihood score with a predefined threshold that is set for a device to be a hostage device or hostage taker device. If the likelihood score is above a threshold defined for a hostage device or hostage taker device, the controller 110 tags the device as a potential hostage device (or hostage-taker device) based on said likelihood score as shown in block 450. Otherwise, at block 460, the controller 110 removes the device from the DOI list 240 and may further instruct the corresponding service provider to return the device to its original state, for example, a previous location tracking configuration state, and upload relevant incident data captured by said device to secure public-safety or carrier-operated computer servers. In accordance with embodiments, the device may be added back to the DOI list 240 if any updated information received from the non-public safety communication networks 120 indicates that the device is associated with a potential hostage or a hostage-taker.

Next, at block 470, the controller 110 checks whether the device currently being processed is the last device in the DOI list 240. In other words, the controller 110 checks whether each device in the DOI list 240 has been processed (according to steps shown in blocks 420-460) and has either been tagged as a hostage device or a hostage-taker device or removed from the DOI list. If the device is the last device in the DOI list, the controller 110 ends the operation of tagging communication devices in the DOI list at block 480. Otherwise, the controller 110 returns to block 420 to receive subscriber profile information 250 and operating characteristics 270 of a next device in the DOI list 240 and processes this information according to steps shown in blocks 420-460 until each device in the DOI list 240 has either been tagged as a hostage device or hostage-taker device or removed from the DOI list 240. Once all devices in DOI list 240 have been tagged or removed from the DOI list 240, a determination is made at block 490 of whether the incident is over, for instance based on user inputs or via an indication received from a remote device or server. If the incident is over, post-incident actions, for instance returning devices to their preexisting conditions, and uploading relevant incident data captured by DOIs to secure public-safety or carrier-operated computer servers, etc., are effected at block 495. Otherwise, if the controller does not receive any indication that the incident is over, the controller 110 returns to block 410 to continue to identify devices operating in the region of interest 170.

In accordance with some embodiments, the controller 110, after tagging each device in the DOI list 240 as either a hostage device or a hostage-taker device, may send information gathered about each device along with the associated tag to one or more remote servers or devices. In one example, the controller 110 may display a visual map (see FIG. 6) of the position of each device in the DOI list 240 along with the respective tags (i.e., hostage device or hostage-taker device). In one embodiment, the visual map may also highlight information (subscriber profile information 250 and operating characteristics 270) obtained for the devices in the DOI list 240. In accordance with some embodiments, the controller 110 may periodically update the DOI list 240 as it receives information about new devices that have entered the region of interest 170 from the non-public safety communication network 120 and performs the method 400 to tag the new devices. Similarly, the visual map may be updated to show the position (and associated tag and information) of the new devices. In one embodiment, the controller 110 may establish a connection with the devices tagged as hostage device via one of the public safety communication networks 130 to exchange information related to the hostage situation. In one embodiment, the connection is established by provisioning the public safety application instance 290 in the hostage devices. In addition, the controller 110 may control the hostage device to operate in covert mode (e.g. activation of a microphone to perform ambient listening) and forward data related to the hostage situation to the controller 110. In one embodiment, the controller 110 may also remotely control one or more components of a device tagged as a hostage-taker device to send information about the hostage-taker to the controller 110.

Figure 5:
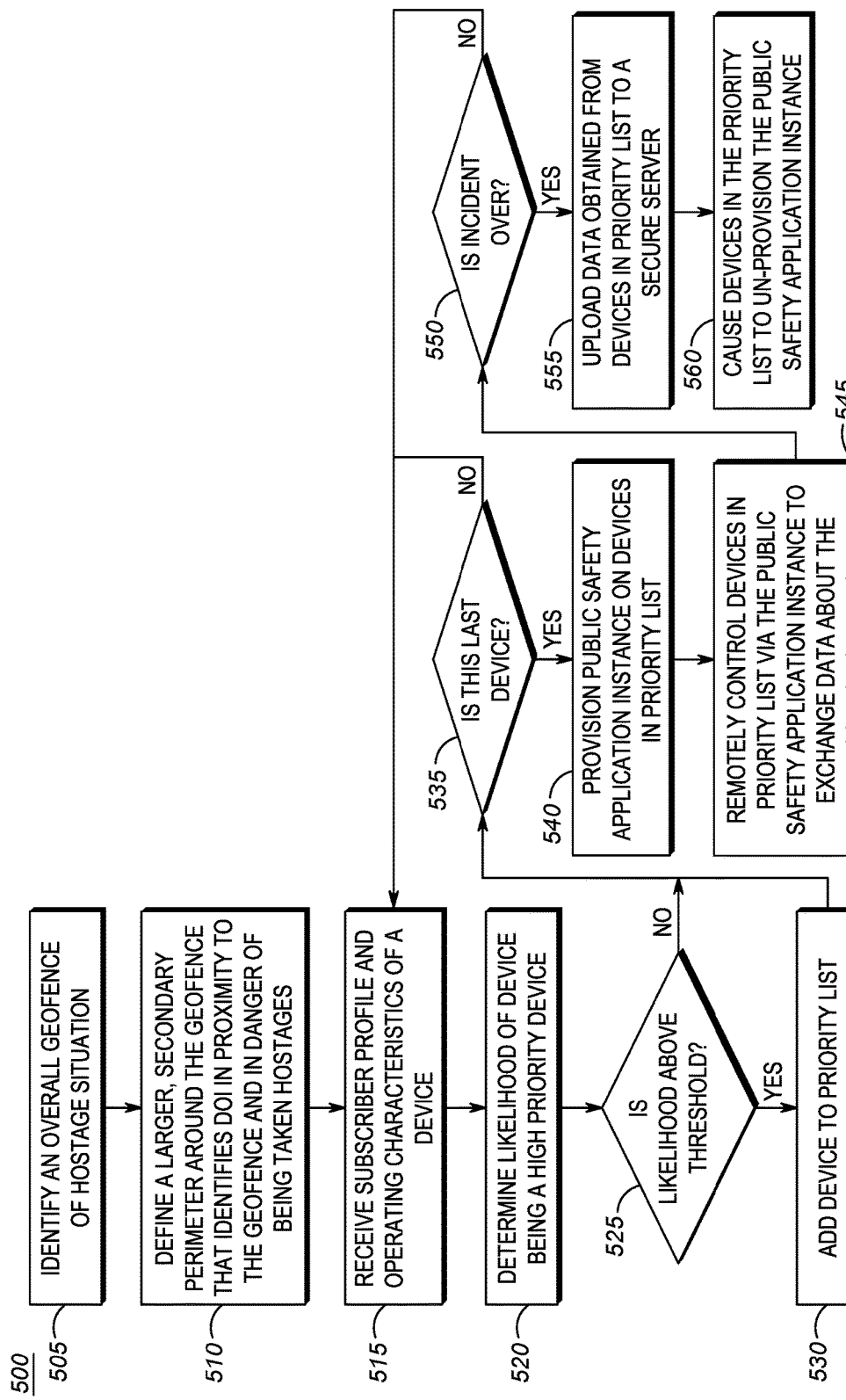
FIG. 5 is a flowchart of a method for operating a controller to communicate with select communication devices in devices of interest list corresponding to a hostage situation, in accordance with some embodiments.

FIG. 5 is a flowchart of an exemplary method 500 for operating a controller 110 to communicate with selected devices (i.e. portable communication devices 150) in a DOI list 240 corresponding to a hostage situation, in accordance with some embodiments. As an example, the method 500 is performed by the electronic processor 210 of the controller 110. Other embodiments of the method 500 may be performed on multiple processors within the same device or on multiple devices.

At block 505, the controller 110 identifies an overall geo-fence (i.e. an incident area 180) corresponding to the hostage situation. Next, at block 510, the controller 110 defines a larger, secondary perimeter around the geo-fence (i.e. region of interest 170) that identifies DOI in proximity to the geo-fence and is in danger of being taken hostages. In one embodiment, the DOI in proximity to the geo-fence are also added to the DOI list. At block 515, the controller 110 receives subscriber profile information and operating characteristics of a device in the DOI list 240, for example, from cellular carriers via non-public safety communication networks 120. For example, the controller 110 obtains location information, device activity, device movement, user identity, and sensor data from cellular carriers and/or other trusted data sources. Next, at block 520 the controller 110 processes this information to determine a likelihood of the device being a 'high priority device'. As user herein, the term "high priority device" refers to a device that is capable of gathering intelligence during the hostage situation and/or a device that is in need of immediate information or warning about the hostage situation. For example, the controller 110 may perform this determination via an analytics tool that processes one or more of the following parameters associated with the obtained information: proximity of the device to the region of interest, level of activity, location and position of the device, battery life of the device, device features, signal strength, etc. In one embodiment, the analytics tool may provide a likelihood score to indicate whether the device meets the requirements of a high priority device. Next, at block 525, the controller 110 determines whether the likelihood score is above a threshold that is set for a high priority device. If the likelihood score is above the threshold, the controller 110 adds the device to a priority list as shown in block 530. In one embodiment, the controller 110 also performs the operation shown in steps 515-535 for devices tagged as hostage devices and adds hostage devices with the likelihood score above the threshold to the priority list. Accordingly, in this embodiment, the high priority device list may include devices located within the geo-fence i.e. incident area 180 (and tagged as hostage devices) as well as devices that are located outside the geo-fence, but within the secondary perimeter i.e. region of interest 170 around the geo-fence.

Returning to block 525, if the controller 110 determines that the likelihood score is below a threshold, the controller 110 proceeds to block 535 to check whether the device is the last device in the DOI list 240. If the device is the last device in the DOI list, the controller 110 returns to block 515 to execute method steps 515-530 until the likelihood score for all devices in the DOI list 240 is processed for determination of whether the devices are a high priority device. Otherwise, if the controller 110 determines that the communication device is the last device, the controller 110 proceeds to block 540 to provision a public safety application instance (e.g. public safety application instance 290) in each device included in the priority list via the respective non-public safety communication networks 120 in one embodiment. In one embodiment, the controller 110 maintains a look-up table in the memory 220 to map each device in the DOI list 240 with the corresponding service provider from which the controller 110 obtained the information (i.e. subscriber profile information 250 and operating characteristics 270) about the device. In this embodiment, the controller 110 uses the look-up table to identify the service provider for each device and send a request to provision the public safety application instance 290 via the corresponding non-public safety communication network 120.

Next, at block 545, the controller 110 remotely controls devices in the priority list, for example, via the public safety application instance 290 provisioned in the respective devices, and exchanges data about the hostage situation. In one embodiment, the controller 110 also selects and adds one or more hostage-taker devices to the priority list in order to control the operation of hostage-taker devices and obtain information (operating characteristics 270 as well as the historical information) stored in the hostage-taker device. In one embodiment, the controller 110 can push covert settings to the devices included in the priority list. The covert settings may configure the devices to perform one or more operations including monitoring and sending data gathered during the hostage situation to the controller 110. In accordance with some embodiments, the covert settings may activate the microphone of the device to perform ambient listening, or activate the camera to capture an image or video, or control a display parameter (such as reduce the brightness) or a sound profile (silent mode or vibration mode), or obtain data from one or more sensors (accelerometer or gyroscope) included in the device, or set an alarm or warning notification, or display messages or notifications (e.g. evacuation route and other emergency response notifications) received from the controller 110. In one embodiment, the covert settings may also allow the device to establish a direct connection with the controller 110 that will allow the device to securely exchange information about the hostage situation via one of the public safety communication networks 130.

Next, at block 550, the controller 110 determines whether it has received an indication that the incident (e.g., hostage situation) is over. For example, this indication may be provided to the controller 110 (via user input or received from a remote device or server) in response to a determination that the hostage situation has returned to normal state. In one embodiment, the controller 110 may receive an instruction to stop tracking the devices operating in the region of interest 170. If the controller 110 does not receive any indication that the hostage situation is over, the controller 110 continues to monitor devices in the DOI list and returns to block 515. In one embodiment, the controller 110 may adjust the area of the geo-fence or the secondary perimeter of the geo-fence to either expand or limit the number of communication devices being monitored (i.e., added to the DOI list) for the purposes of exchanging information about the hostage situation. In this embodiment, the controller 110 will repeat the operation for new devices added to the list. Returning to block 550, if the controller 110 receives an indication that the incident is over, the controller 110 proceeds to block 555 to control the devices included in the priority list to upload data stored in the respected devices during the hostage situation to a secure server (or to the controller 110) via one of the public safety communication networks 130. In one embodiment, the public safety application instances 290 provisioned in the respective communication devices may tag information collected and stored in the device during the hostage situation with a time stamp and device identifier for later processing. Next, at block 560, the controller 110 causes the devices included in the priority list to un-provision or uninstall the public safety application instance 290 and also remove data that are collected and stored during the hostage situation in the respective devices.

Figure 6:
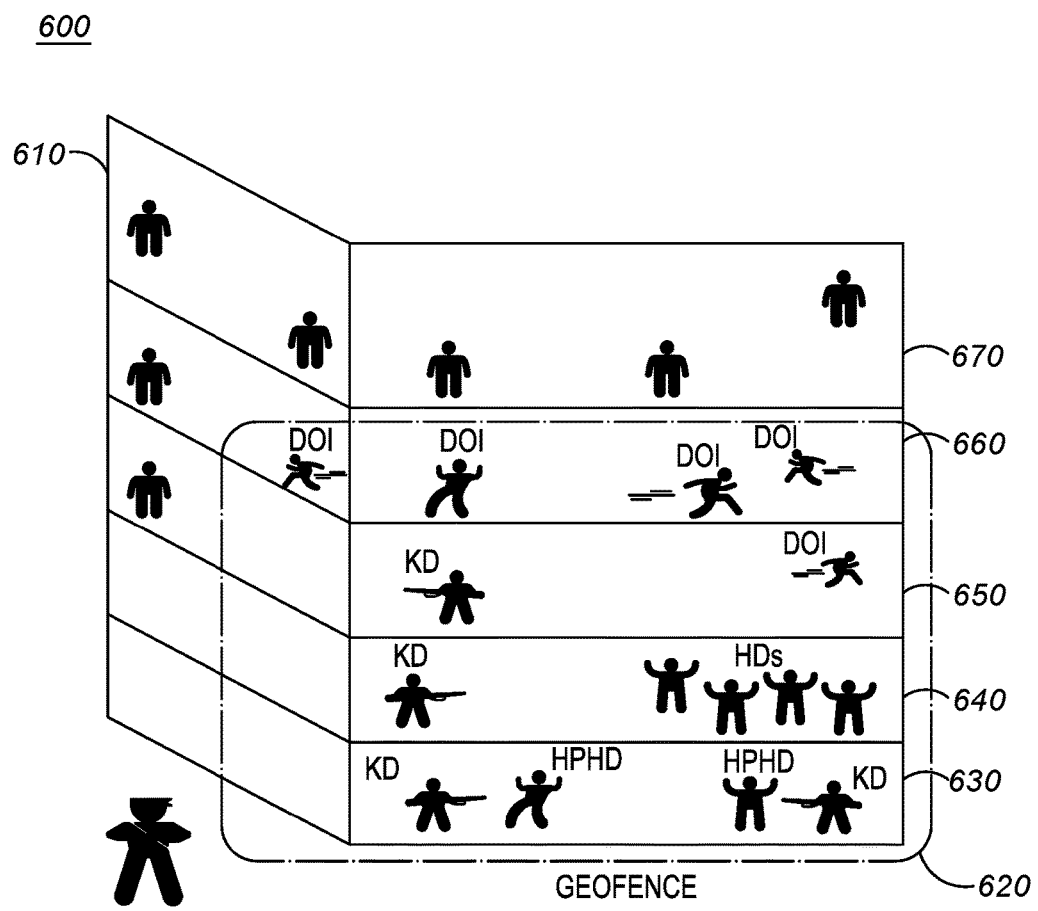
FIG. 6 illustrates a visual map of a hostage situation scenario, in accordance with some embodiments.

FIG. 6 illustrates a visual map 600 of a hostage situation scenario in a building 605, in accordance with some embodiments. In FIG. 6, the visual map 600 identifies a region of interest, for example, an area surrounding the building 610 where the hostage situation is shown as taking place within an identified geo-fence 620. The geo-fence 620 identifies the incident area (i.e. floors 630, 640, 650, 660) that is most impacted by the hostage situation. In one embodiment, the visual map 600 of the hostage situation scenario is generated by the electronic processor 210 and displayed in real-time at the controller 110 or at a remote server or at a radio device associated with a public safety officer. In accordance with some embodiments, the controller 110 periodically updates the visual map 600 to update the DOI in the region of interest, for example, when the controller 110 identifies new devices operating in the building structure or receives updated information (e.g., location information 260 stored within memory 220) for the identified DOI. As shown in FIG. 6, the controller 110 adds a tag to indicate a device associated with an individual as hostage device (HD) or hostage-taker device/kidnapper device (KD) or high priority hostage device (HPHD) device. In some scenarios, it is possible that the device associated with a hostage-taker or in possession of the hostage-taker may in actual belong to one of the hostages, and therefore to avoid false association or tagging of a device, the controller 110 may correlate operating characteristics of the device such as inertial activity trend, activity level, and position with subscriber profile information to tag the device to an individual in the incident scene. A device (or individual) tagged as 'HPHD' indicates to a public safety officer monitoring the visual map 600 that 'HPHD' is provisioned with public safety application instance 290 and is capable of gathering intelligence about the hostage situation. FIG. 6 also shows some individuals located outside the geo-fence 620 i.e. in floor 670 where there is no hostage activity and some individuals in floor 660 tagged as DOI. It is possible that an individual located in floor 660 and unaware of the hostage situation, may be moving towards the geo-fence 620, i.e. to one of the floors 630-660 impacted by the hostage situation. In this case, the controller 110 continues to identify and monitor DOI in other floors within the region of the interest and issues warning notifications/alerts and provides evacuation route to the users of these devices.

In accordance with embodiments of the disclosure, the system and methods described herein can be advantageously employed to tag devices operating in different public safety incident scenarios that are not limited to hostage situations. In addition, the methods described herein not only tags the devices operating in a region of interest, but also enables these devices to securely exchange real-time information or intelligence corresponding to a public safety incident with responding officers. The methods described herein also obviate the need for users to manually provision the communication devices to operate in public safety mode during a highly-stressful emergency situation. The information or intelligence obtained from user devices that are located or positioned within or proximity to the incident scene provides more accurate information for responding officers and enables responding officers to be more effectively prepared for their response, which in turn limits casualties associated with such incidents. The information obtained from such devices also provides the investigating officers with evidence and clues about persons of interest related to the incident and also serve as factual forensic-grade data that can be used for prosecutions, as well as for trainings and to improve methods for future responses to such incidents. The methods described herein also allows issuance of real-time warning notifications and evacuation routes to devices operating in proximity or outside the location of incident scene, thereby limiting the casualties associated with such incidents.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a controller to exchange information corresponding to a public safety incident, the method comprising:
   transmitting a request to one or more communication networks to send location information for portable communication devices operating in a region of interest;
   identifying an incident area and a non-incident area within the region of interest corresponding to the public safety incident;
   identifying portable communication devices operating in the incident area based on the location information received from the one or more communication networks for the portable communication devices;
   selecting a subset of portable communication devices based on the identified portable communication devices;
   receiving a subscriber profile and operating characteristics corresponding to the portable communication devices in the subset from the one or more communication networks;
   assigning each of the portable communication devices to one of a trusted group of devices and a non-trusted group of devices based on the respective subscriber profile and operating characteristics of the portable communication devices; and
   establishing a connection with one or more of the portable communication devices in the trusted group to exchange information corresponding to the public safety incident.

2. The method of claim 1, wherein establishing a connection further comprises:
   determining, for each portable communication device in the trusted group, whether the portable communication device meets a predefined condition of being a high priority device based at least on the operating characteristics of the portable communication device;
   establishing the connection with only the one or more of the portable communication devices that meet the predefined condition of being the high priority device; and
   provisioning, via the one or more communication networks, a public safety application instance in the one or more of the portable communication devices in the trusted group.

3. The method of claim 2, further comprising:
   initiating, via the public safety application instance, a handover procedure to switch the connection of the one or more of the portable communication devices in the trusted group from the one or more communication networks to a public safety communication network; and
   remotely controlling the one or more of the portable communication devices in the trusted group to operate in covert mode.

4. The method of claim 3, wherein remotely controlling the one or more of the portable communication devices in the trusted group to operate in covert mode, comprises at least one of:
   controlling a microphone of the one or more of the portable communication devices to perform ambient listening;
   controlling a sound profile of the one or more of the portable communication device;

controlling a display parameter of the one or more of the portable communication device;

activating a global positioning system (GPS) system of the portable communication device;

monitoring a state of charge of a battery of the portable communication device; and activating one or more sensors of the portable communication device.

5. The method of claim 2, further comprising:

determining that at least one of the one or more of the portable communication devices in the trusted group no longer meets the predefined condition of being the high priority device; and causing the at least one of the portable communication devices in the trusted group to un-provision the public safety application instance, remove data stored corresponding to the public safety incident from at least one of the portable communication devices, and upload the data stored corresponding to the public safety incident to a server.

6. The method of claim 1, wherein assigning comprises:

monitoring, via the one or more communication networks, operating characteristics of the portable communication device in the subset;

verifying, via the one or more communication networks, the subscriber profile corresponding to the portable communication device based on information received from one or more trusted data sources;

assigning the portable communication device to the trusted group when the operating characteristics meet a predefined condition and when the corresponding subscriber profile is verified; and assigning the portable communication device to the non-trusted group when the operating characteristics do not meet the predefined condition or when the corresponding subscriber profile is not verifiable.

7. The method of claim 6, wherein the operating characteristics of the portable communication device include information selected from the group consisting of: a frequency of movement of the device, orientation of the device, operating features of the device, signal strength, identity of the device, inertial activity trend of the device, and a battery condition of the device, and further wherein the subscriber profile includes identity and historical information associated with a user of the device.

8. The method of claim 1, further comprising:

identifying portable communication devices operating in the non-incident area based on the location information; and transmitting, via the one or more communication networks, evacuation route instructions to the identified portable communication devices.

9. The method of claim 8, further comprising:

determining that one or more of the identified portable communication devices in the non-incident area has either moved to the incident area or is operating within a predetermined distance from one or more of the portable communication devices in the non-trusted group; and transmitting, via the one or more communication networks, a warning notification to the one or more of the identified portable communication devices, in response to the determination.

10. The method of claim 1, wherein the request to send location information further comprises a request to activate location tracking for portable communication devices operating in the region of the interest.

11. The method of claim 10, further comprising:

transmitting a second request to the one or more communication networks to return the communication devices not included in the selected subset to a previous location tracking configuration state.

12. The method of claim 1, wherein the one or more communication networks correspond to a cellular carrier network identified by the controller.

13. A method of operating a controller to exchange information corresponding to a public safety incident, the method comprising:

transmitting a request to one or more communication networks to send location information for portable communication devices operating in a region of interest;

selecting a subset of portable communication devices based on location information received from the one or more communication networks for the portable communication devices;

receiving a subscriber profile and operating characteristics corresponding to the portable communication devices in the subset from the one or more communication networks;

assigning each of the portable communication devices to one of a trusted group of devices and a non-trusted group of devices based on the respective subscriber profile and operating characteristics of the portable communication devices;

establishing a connection with one or more of the portable communication devices in the trusted group to exchange information corresponding to the public safety incident;

determining that the public safety incident corresponds to a hostage situation;

tagging the portable communication devices in the trusted group as hostage devices and the portable communication devices in the non-trusted group as hostage-taker devices; and causing the portable communication devices tagged as hostage devices to communicate real-time information corresponding to the hostage situation via the established connection.

14. The method of claim 13, further comprising:

generating a visual map identifying the region of interest and a position of the hostage devices and hostage-taker devices within the region of interest.

15. A controller for exchanging information corresponding to a public safety incident, the controller comprising:

a network interface; and an electronic processor coupled to the network interface, the electronic processor configured to:

transmit, via the network interface, a request to one or more communication networks to send location information for portable communication devices operating in a region of interest, identify an incident area and a non-incident area within the region of interest corresponding to the public safety incident;

identify portable communication devices operating in the incident area based on the location information received from the one or more communication networks for the portable communication devices;

select a subset of portable communication devices based on the identified portable communication devices;

receive, via the network interface, a subscriber profile and operating characteristics corresponding to the portable communication devices in the subset from the one or more communication networks, assign each of the portable communication devices to one of a trusted group of devices and a non-trusted group of devices based on the respective subscriber profile and operating characteristics of the portable communication devices, and establish, via the network interface, a connection with one or more of the portable communication devices in the trusted group to exchange information corresponding to the public safety incident.

16. The controller of claim 15, further comprising:
a memory that maintains a database including
   a devices of interest (DOI) list that identifies the selected subset of portable communication devices,
   subscriber profile and operating characteristics corresponding to the portable communication devices in the DOI list, and
   group assignment information that identifies the assignment of each portable communication device in the DOI list to one of the trusted group or non-trusted group.

17. The controller of claim 16, wherein the memory stores one or more public safety application instances, and further wherein the electronic processor is configured to establish the connection between the network interface and the portable communication devices in the trusted group via a public safety communication network, and further control the portable communication devices in the trusted group to operate in covert mode.

18. The controller of claim 15, wherein the electronic processor is further configured to:
   receive an indication that the public safety incident corresponds to a hostage situation,
   determine a likelihood score for each portable communication device in the subset based on the respective subscribe profile and operating characteristics; and
   tag each portable communication device as a hostage device or hostage-taker device based on a comparison of the likelihood score with a predefined threshold that is set for a device to be a hostage device or hostage-taker device.

19. The controller of claim 18, wherein the electronic processor is configured to generate a visual map identifying the region of interest and a position of the hostage device and hostage-taker device within the region of interest.

* * * * *